(12) United States Patent
Russell et al.

(10) Patent No.: US 7,222,231 B2
(45) Date of Patent: May 22, 2007

(54) DATA SECURITY FOR DISTRIBUTED FILE SYSTEMS

(75) Inventors: Lance W. Russell, Hollister, CA (US); Lu Xu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1122 days.

(21) Appl. No.: 09/838,759

(22) Filed: Apr. 19, 2001

(65) Prior Publication Data

US 2002/0157016 A1    Oct. 24, 2002

(51) Int. Cl.
*H04L 9/00* (2006.01)
(52) U.S. Cl. ........................ 713/165; 713/167
(58) Field of Classification Search ........... 707/165, 707/200, 104, 167; 380/210, 286; 713/165
See application file for complete search history.

(56) References Cited

U.S. PATENT DOCUMENTS

| 5,931,947 | A | 8/1999 | Burns et al. | |
|---|---|---|---|---|
| 6,249,866 | B1 * | 6/2001 | Brundrett et al. | 713/165 |
| 6,678,700 | B1 * | 1/2004 | Moore et al. | 707/200 |
| 2002/0071556 | A1 * | 6/2002 | Moskowitz et al. | 380/210 |

FOREIGN PATENT DOCUMENTS

DE      10032962 A     3/2001

OTHER PUBLICATIONS

Kaplan, IBM Cryptolopes, SuperDistribution and Digital Rights Management, 1996, IBM, pp. 1-10.*

Bellare et al, Verifiable Partial Key Escrow, 1997, ACM, pp. 78-91.*

Solomon D, A, The windows NT kernal Architecture, Computer IEEE computer society, Long Beach, CA, US, US, vol. 31, No. 10, Oct. 1998, pp. 40-47, XP000859745, ISSN:0018-9162, p. 42, col. 1-3, line 1-line 20.

Thomas E. Anderson, et al, Serverless Network File Systems, Operating systems review (SIGOPS), acm headquarter. New York, US, vol. 29, No. 5, Dec. 1, 1995, pp. 109-126, XP000584821.

Garth Gibson, et al, "NASD: Network-attached Secure Disks", Online ! Dec. 14, 1999, XP002254628.

Gibson, Nagle et al., NASD Scaleable Storage Systems:, USENIX99, Extreme Linux Workshop, Monterey CA, Jun. 1999.

(Continued)

*Primary Examiner*—Kim Vu
*Assistant Examiner*—Paula Klimach
(74) *Attorney, Agent, or Firm*—Richard P. Lange

(57) ABSTRACT

A method and apparatus for data security for a distributed file system. A distributed file system interface is coupled to the one or more client applications, and a storage server and a meta-data server are coupled to the distributed file system interface. The meta-data server receives open-file requests from the distributed file system interface and in response creates a security object. The meta-data server also generates an partial encryption key and stores the partial encryption key in the security object. The block storage server completes the encryption key, and the meta-data server encrypts the list of blocks that are in the file and stores the encrypted block list in the security object. The security object is then returned to the distributed file interface and used in subsequent file access requests.

13 Claims, 4 Drawing Sheets

OTHER PUBLICATIONS

Goibioff, Nagle, Gibson, "Integrity and Performance in Network Attached Storage", Carnegie Mellon University, School of Computer Science Technical Report, CMU-CS-182, Dec. 1998.

Gibson, Nagle, Amiri, et al., "A Cost-effective, High-bandwidth Storage Architecture," Proceedings of the 8th Conference on Architectural Support for Programming Languages and Operating Systems, 1998.

Gibson, Nagle, Amiri, et al., "Filesystems for Network-Attached Secure Disks", CMU SCS Technical Report version of Carnegie Mellon University School of Computer Science Technical Report, "Security for Network Attached Storage Devices", CMU-CS-97-185, Jul. 1997.

Gibson, Nagle, Amiri, et al., "File Server Scaling with Network Attached Secure Disks", Proceeding s of the ACM International Conference on Measurement and Modeling of Computer Systems (Sigmetrics '97), Seattle, WA, Jun. 15-18, 1997.

Riedel, Gibson, Understanding Customer Dissatisfaction with Underutilized Distributed File Servers. Proceedings of the 5th NASA Conference on Mass Storage Systems and Technologies, College Park, MD, Sep. 17-19, 1996.

* cited by examiner

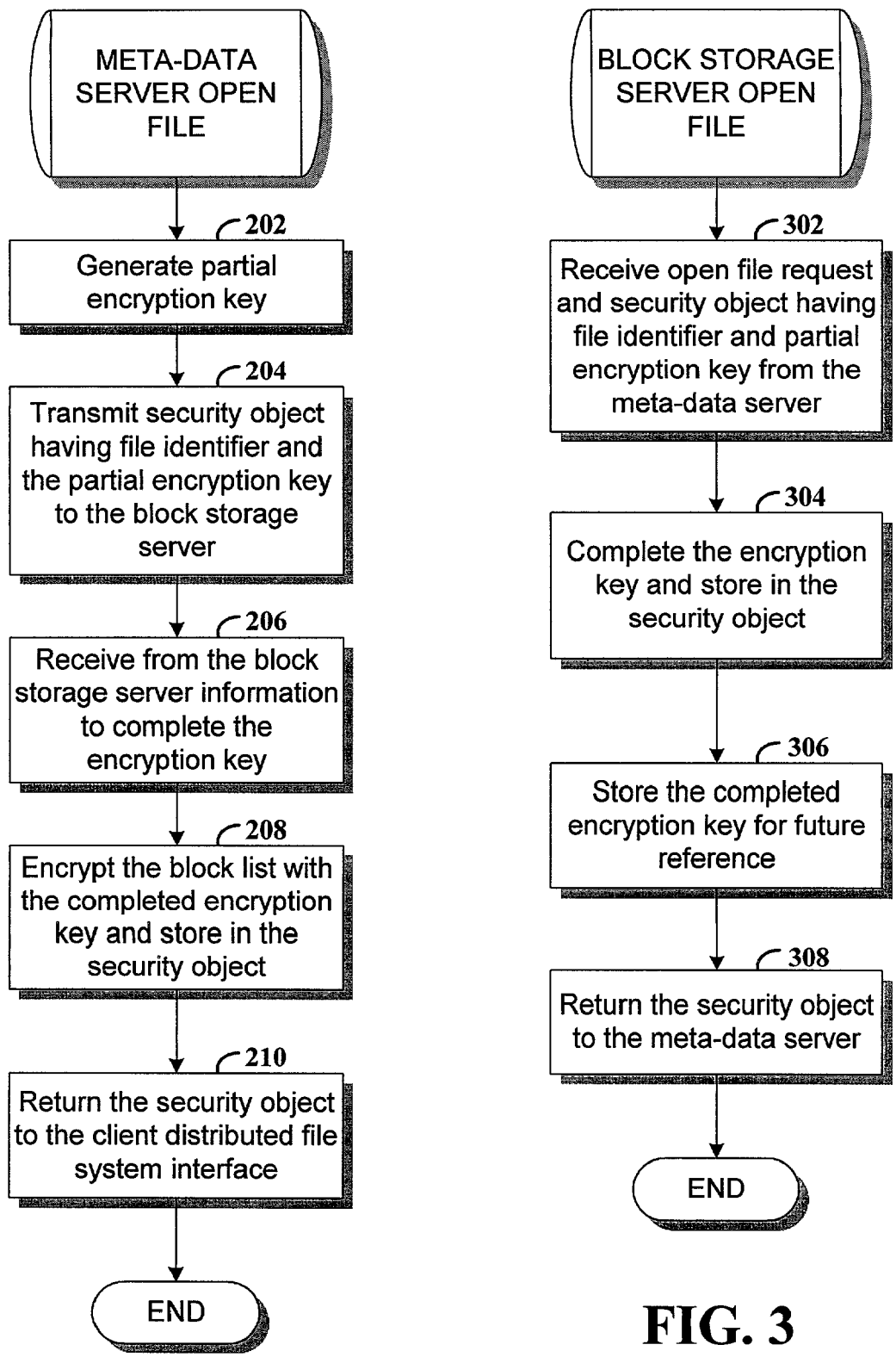

DATA SECURITY FOR DISTRIBUTED FILE SYSTEMS

FIELD OF THE INVENTION

The present invention generally relates to data security for distributed file systems, and more particularly to dynamically created objects for enforcing security in distributed file systems.

BACKGROUND

The growth of the Internet is driving the need for additional data storage capacity. While the need for data storage devices is readily met with additional storage devices, performance is often hindered by the manner in which access is provided to the data.

Many computer networks provide access to data through storage controllers, each of which controls access to one or more storage devices. A storage controller may create a bottleneck that limits data throughput if many client applications seek access to data controlled by the same storage controller, or each if a few client applications move a large quantity of data through the same storage controller.

A current solution to the problem is the used of network-attached secure devices (NASD). The NASD architecture allows client nodes to directly access specific storage objects by supporting a cache capability. The cache allows file data and some control information to be transmitted to a client node only once via the network, and there is no centralized storage controller to create a bottleneck. While this addresses the bottleneck issue, data security must now be addressed at the storage device level.

A common NASD architecture provides a NASD interface and file system where files and directories are stored in NASD objects. Each file and directory occupies a dedicated NASD object. Security is based on cryptographic attributes of the objects, and the objects are static. That is, a file object is created when the file is created and exists as long as the file exists. Furthermore, objects are inherently supported at the device level and each is therefore limited by the device with which the object is associated.

Since each file has an associated object, the client applications that access the files must be programmed to handle the objects. Thus, a major software upgrade may be required to implement a NASD-based system with existing client applications. In addition, enforcing security at the file level may create excess system overhead through encryption and key management.

A system and method that address the aforementioned problems, as well as other related problems, are therefore desirable.

SUMMARY OF THE INVENTION

In various embodiments, the invention provides data security in a distributed file system. A distributed file system interface is coupled to the one or more client applications, and a storage server and a meta-data server are coupled to the distributed file system interface. The meta-data server receives open-file requests from the distributed file system interface and in response creates a security object. The meta-data server also generates an partial encryption key and stores the partial encryption key in the security object. The block storage server completes the encryption key, and the meta-data server encrypts the list of blocks that are in the file and stores the encrypted block list in the security object. The security object is then returned to the distributed file interface and used in subsequent file access requests.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIG. 2 is a flowchart of a process performed by a meta-data server in opening a file;

FIG. 3 is a flowchart of a process performed by a storage server in servicing an open file request;

DETAILED DESCRIPTION

Figure 1:
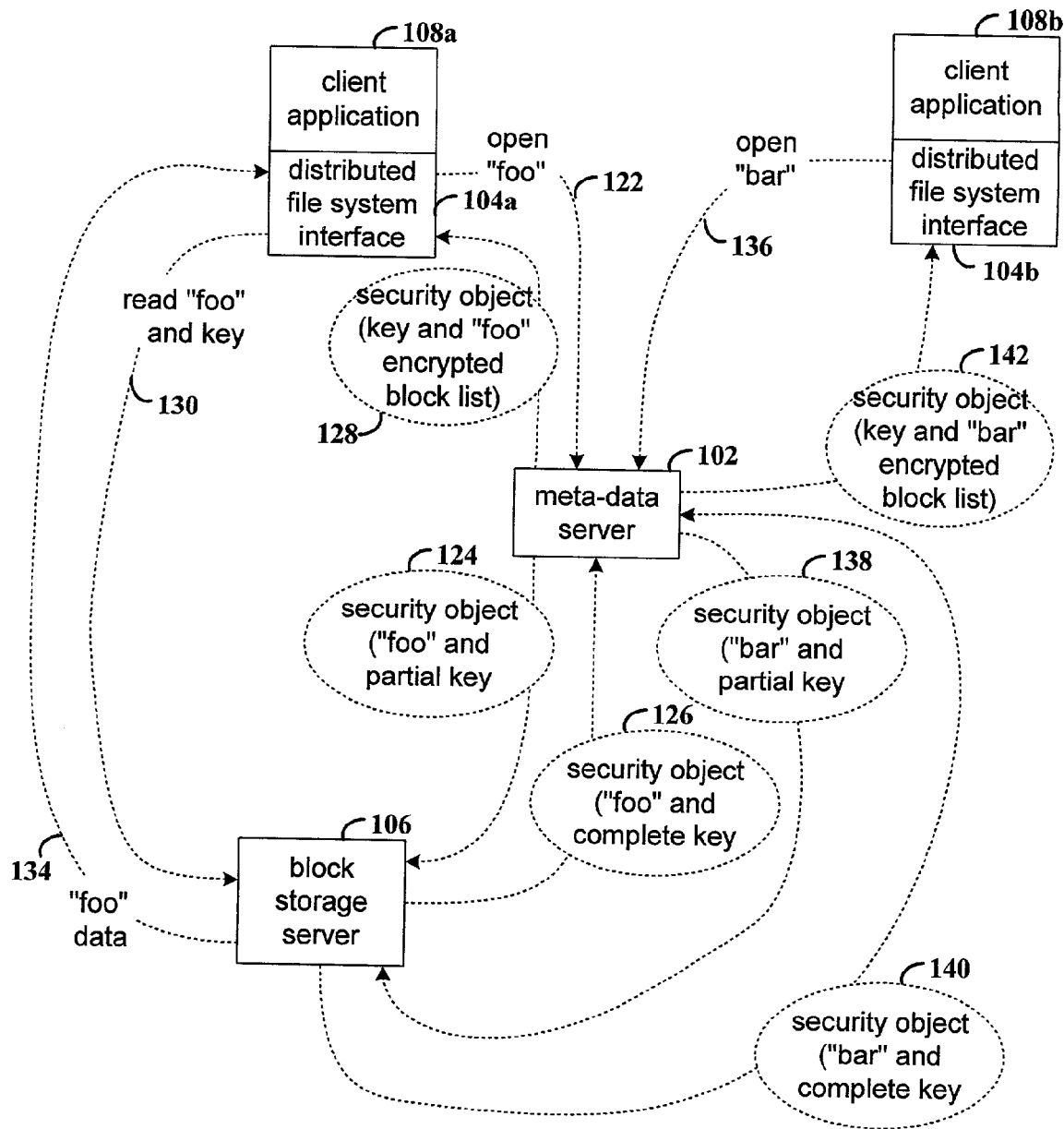
FIG. 1 is a functional block diagram that illustrates the data flow between a client application, meta-data server, and block storage server in accordance with one embodiment of the invention.

FIG. 1 is a functional block diagram that illustrates the data flow between a client application, meta-data server, and block storage server in accordance with one embodiment of the invention. Data security is provided by meta-data server 102, distributed file system interfaces 104a and 104b, and block storage server 106. By implementing the functions of meta-data server 102 on a separate system from storage server 106, the bottlenecks associated with a storage controller implementation are avoided. In addition, since security is handled by the distributed file system interface 104a, 104b, in conjunction with the meta-data server 102 and the storage server 106, the client application does not need to be specially programmed for security considerations and associated system overhead on the client system is avoided.

Meta-data server 102 services file access requests for one or more distributed file system interfaces 104a, 104b. Each of the distributed file system interfaces services one or more client applications. For example, distributed file system interface 104a services client application 108a, and distributed file system interface 104b services client application 108b. The file data in the distributed file system is stored by one or more block storage servers, for example, block storage server 106.

In one embodiment, meta-data server is implemented on a data processing system that is coupled to the distributed file system interfaces 104a, 104b and to the storage server 106 by a network, such as a LAN or WAN, for example. Similarly, each distributed file system interface is implemented on a separate data processing system. The distributed file system interface can be implemented, for example, as shown in the patent/application entitled, "EXTENDING A STANDARD-BASED REMOTE FILE ACCESS PROTOCOL AND MAINTAINING COMPATIBILITY WITH A STANDARD PROTOCOL STACK" having patent/application Ser. No. 09/774,841, filed on Jan. 31, 2001 by Karamanolis et al., the contents of which are incorporated herein by reference. Block storage server 106 can be implemented using conventional block-based storage server systems. Those skilled in the art will appreciate that various alternative data processing arrangements are adaptable to provide the capabilities of the present invention.

Meta-data server 102 manages meta-data and security for files under its control. Meta-data includes: file I-nodes, block bitmaps, ownership, access times, system parameters, and other information that describes the files in the system. The i-node includes a list of blocks in the file, which the meta-data server 102 passes to the block storage server 106.

Security is managed on two levels. On the first level, read/write permission to files is managed using permission codes that are associated with different client applications. For example, a first client application may have only read permission to a file, while a second client application has read and write permissions to the file. On the second level, the meta-data server manages secure transmission of file data over the network that connects the storage server 106 and the distributed file system interfaces 104a, 104b. The secure transmission of data is accomplished using an encryption key that is transmitted in a security object between the meta-data server 102, distributed file system interfaces 104a, 104b, and storage server 106.

The permission codes for a file are maintained by the meta-data server 102 and configured when a file is created or when a client application needs access to a file. The manner in which the meta-data server 102 maintains the permission codes with storage server 106 and the management of encryption keys for encrypting file data transmitted over a network alleviates the storage controller bottleneck of prior systems while providing for secure transmission of data.

FIG. 1 illustrates an example interaction between the client applications 108a and 108b and the distributed file system in opening files named "foo" and "bar." Client application 108a uses distributed file system interface 104a to open foo. The open file request is transmitted to the meta-data server 102 as shown by line 122. The meta-data server creates a security object (if one does not already exist) for the protection domain of which the requesting client application is a member. In this example, client application 108a, and client application 108b are in the same protection domain and have access to data on storage server 106 using the same encryption key.

In response to the open file request, the meta-data server 102 first generates an encryption key. Then the security object, along with the open file request, is transmitted to the storage server 106 as illustrated by ellipse 124. The security object includes a file identifier, encryption key, and a permission code that is associated with the client application. The security key is passed between components because the keys are created collaboratively (for security), and the components will use them to decrypt the information. Block storage server 106 receives the security object and generates a list of blocks in the referenced file. The block list generally includes enough information for the block server to locate the data in subsequent requests from the client application, and the specific information is implementation dependent. The block list is then encrypted using the encryption key in the security object and stored in the security object, and the updated security object is returned to the meta-data server 102, as shown by ellipse 126. The meta-data server 102 then returns the security object to the distributed file system interface 104a as shown by ellipse 128. The distributed file system interface 104a then returns a status code to the client application 108a. Note that the security object remains with the distributed file system interface 104a, and the client application 108a does not have access to nor need the encryption key.

When client application 104a issues a read request for foo, the distributed file system interface forwards the read request, along with the encrypted block list and encryption key from the security object, to the storage server 106, as illustrated by line 130. The storage server uses the encryption key to decrypt the block list. The storage server 106 responds by retrieving and encrypting the requested data and then returning the encrypted data as shown by line 134.

Independent of client application 108a, client application 108b issues a request to open bar. The distributed file system interface 104b responds by transmitting an open file request to the meta-data server 102 as shown by line 136. Since client applications 108a and 108b are in the same security domain, the meta-data server adds the file identifier for bar to the security object and transmits the security object to the storage server 106 as shown by ellipse 138. Since the client applications 108a and 108b are in the same security domain, the same encryption methodology is used for both foo and bar. However, a new encryption key is created each time a file is opened. A dedicated security object is established for each security domain. Thus, each distributed file system interface is configured to service client applications in different security domains by using the security objects as they are passed by the meta-data server.

The storage server 106 responds to the request to open bar by encrypting the bar block list and adding the encrypted block list to the security object. The updated security object is then returned to the meta-data server as shown by ellipse 140. The meta-data server 102 returns the security object to the distributed file system interface 104b as shown by ellipse 142.

FIG. 2 is a flowchart of a process performed by a meta-data server in opening a file in accordance with one embodiment of the invention. The process assumes that the file to be opened was already created and populated with data. In addition, read/write permissions for different client applications are associated with the files by the meta-data server according to application requirements.

At step 202, if the open file request is the first request by a client application in a particular security domain, the meta-data server generates a partial encryption key for use with the security object. Those skilled in the art will recognize that various encryption techniques may be suitable, depending on implementation requirements. Depending on implementation requirements, the same technique could be used in all the security domains to establish the encryption keys. Alternatively, different techniques could be used in different security domains. At step 204, the security object is transmitted to the storage server, wherein the security object includes the file identifier of the requested file, and the partial encryption key.

The storage server returns information necessary for the meta-data server to complete the encryption key, and at step 206, the meta-data server receives the information from the storage server. At step 208, the block list that is maintained by the meta-data server is encrypted and added to the security object, and at step 210 the security object is returned to the distributed file system interface. The meta-data server saves copies of all security objects that are associated with the blocks of open files, along with associations with the client systems with which the security objects are associated. While not shown, it should be understood that the distributed file system interface returns a status code to the requesting client application and saves the security object for subsequent file access requests. Thus, the client application need not be programmed to handle secure data transmissions.

The block list in the security object is updated by the meta-data server. When a file is truncated, for example, the meta-data server revokes all open accesses for the impacted blocks before the write is allowed to occur. Subsequent reads of these blocks proceed with new objects. Those skilled in the art will appreciate that the meta-data server is involved in file operations that result in changes to the block list. For example, in processing a write request in one implementation, the distributed file system interface submits a write request to the metadata server. In response, the meta-data server locks the section of the file being written and makes any necessary changes to the block list.

FIG. 3 is a flowchart of a process performed by the storage server in servicing an open file request in accordance with one embodiment of the invention. At step 302, the storage server receives an open file request and the security object from the meta-data server. The open file request includes the file identifier of the file to open, and the security object includes the partial encryption key for the security domain in which the file is opened.

At step 304, the storage server completes the encryption key and stores it in the security object. At step 306, the encryption key is stored for later use. When the storage server receives a file access request along with an accompanying security object from a client, the saved encryption key is used to decrypt the block list from the security object. If the block list is successfully decrypted, the client is provided with the requested access. At step 308, the updated security object is returned to the meta-data server.

Figure 4:
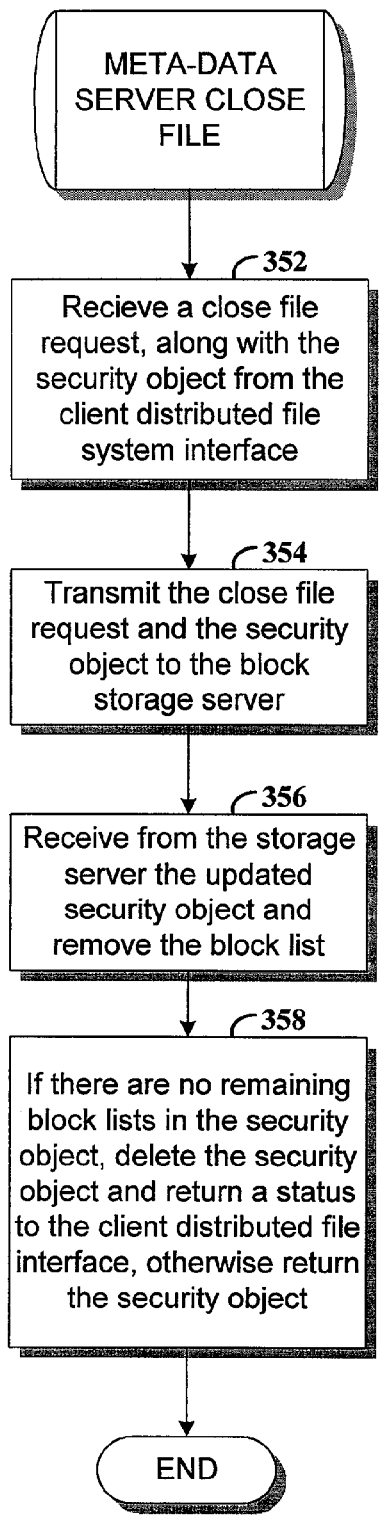
FIG. 4 is a flowchart of a process performed by a meta-data server in closing a file.

FIG. 4 is a flowchart of a process performed by the meta-data server in closing a file. At step 352, the meta-data server receives a close file request from a distributed file system interface. The distributed file system interface also transmits the security object to the meta-data server along with the close file request.

At step 354, the close file request and security object are transmitted to the storage server. The meta-data server then waits for a response from the storage server before continuing the process. At step 356, the meta-data server receives the updated security object from the storage server and removes the block list of the requested file from the security object.

At step 358, the meta-data server checks whether there are any remaining block lists in the security object. If not, the security object is deleted, and a status code is returned to the distribute file system interface. Otherwise, the security object is returned to the distributed file system interface.

Figure 5:
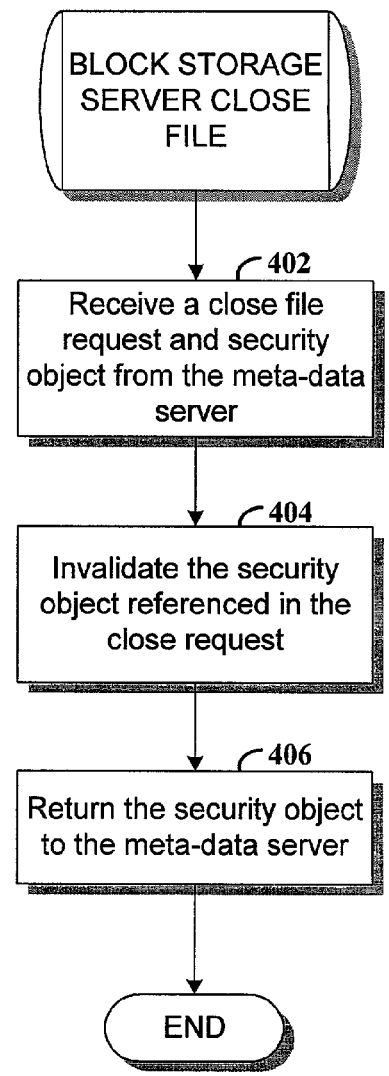
FIG. 5 is a flowchart of a process performed by a storage server in closing a file.

FIG. 5 is a flowchart of a process performed by a block storage server in closing a file. At step 402, the block storage server receives a close file request from the meta-data server along with the security object for the security domain to which the requesting client application belongs. At step 404, the storage server invalidates the security object within the storage server so that any further requests with the invalidated object will be refused. At step 406, the security object is returned to the meta-data server.

Figures 6, 7:
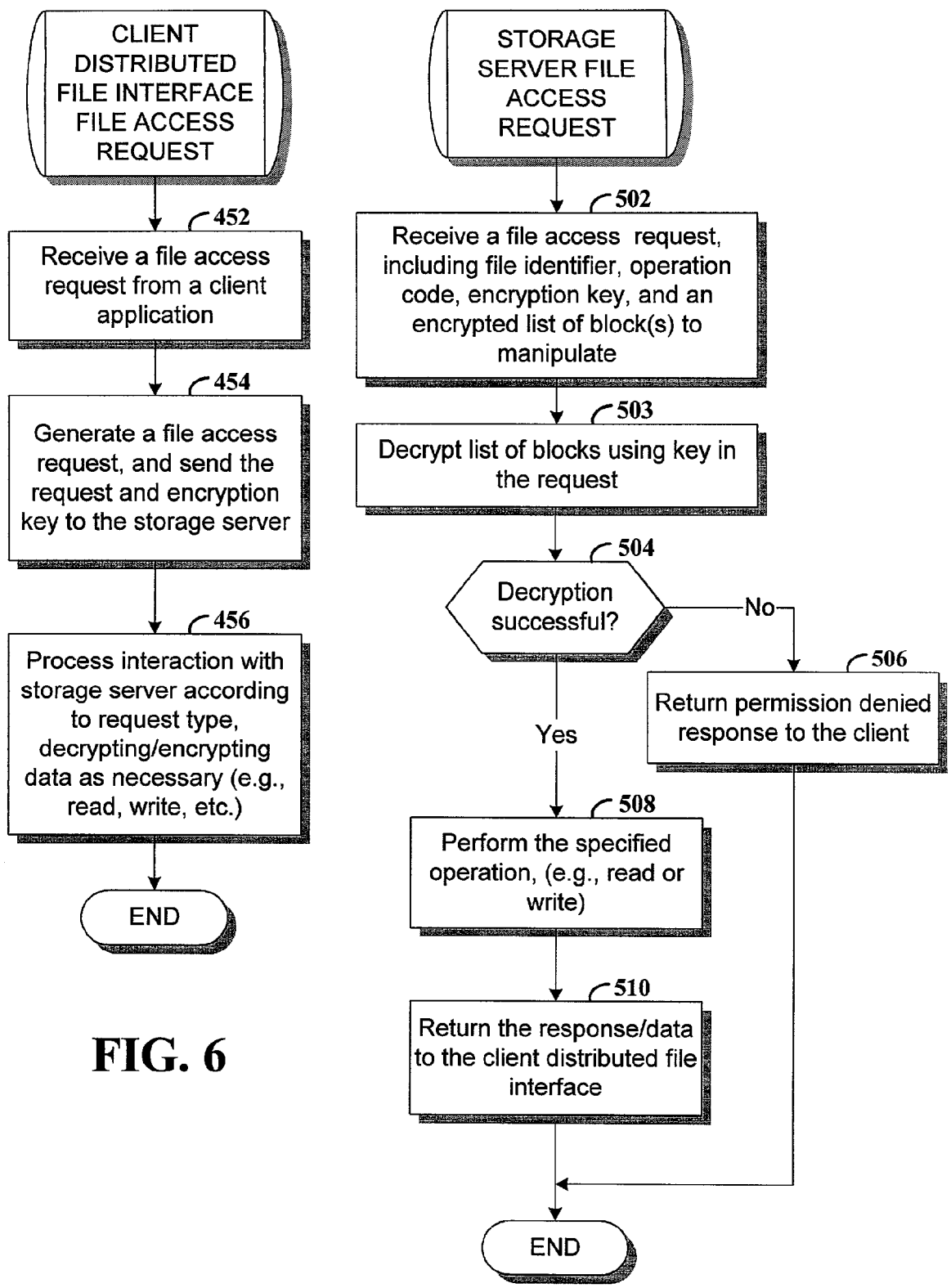
FIG. 6 is a flowchart of a process performed by a distributed file system interface in processing a file access request.
FIG. 7 is a flowchart of a process performed by a storage server in processing a file access request.

FIG. 6 is a flowchart of a process performed by the client distributed file system interface in processing a file access request. At step 452, the request is received from the client application, and at step 454 a file access request is generated and sent to the storage server having the file data. The request to the storage server includes the encryption key from the security object for the client.

At step 456, the distributed file system interface processes the interaction with the storage server in accordance with the type of file access request. For example, if the request is a read, the distributed file system interface awaits data from the storage server. When the data are received, the distributed file system interface decrypts the data and returns the data to the client application.

For a write request, the distributed file system interface encrypts the data provided by the client application and sends the encrypted data to the storage server. The distributed file system interface also returns status codes from the storage server to the client application.

FIG. 7 is a flowchart of a process performed by the storage server in processing a file access request. At step 502, the storage server receives from a distributed file system interface a file access request. The file access request includes a file identifier, an operation code, an encryption key, and an encrypted list of the blocks of data to manipulate.

At step 503, the encrypted list of blocks is decrypted using the key from the request. Decision step 504 tests whether the decryption was successful. If the decryption was successful, the block storage server assumes that the client application has the necessary access rights. Otherwise, the process is directed to step 506 where a status code is returned to the distributed file system interface to indicate that access was denied.

If the client application has the necessary access rights, decision step 504 directs the process to step 508. At step 508, the operation specified by the operation code is performed. If the distributed file system interface is reading data, the data read are returned to the distributed file system interface. If the distributed file system interface is writing data, the encrypted data received from the distributed file system interface is written to the storage device. At step 510, the response/data are returned to the distributed file system interface.

Embodiments of the present invention, beyond those described herein, will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for controlling access by a plurality of client applications to file data in a distributed file system including a distributed file system interface coupled to the client applications and a storage server and a meta-data server coupled to the distributed file system interface, comprising:

receiving at the meta-data server an open-file request, the open-file request specifying a name of a first file, wherein the first file includes a first set of blocks;

creating a security object at the meta-data server in response to the open-file request;

generating a partial encryption key at the meta-data server and storing the partial encryption key in the security object;

transmitting the security object to the storage server;

completing generation of the encryption key at the storage server using the partial encryption key and storing a complete encryption key in the security object;

returning the security object with the complete encryption key to the meta-data server;

encrypting a list that identifies the first set of blocks, whereby an encrypted block list is formed;

adding the encrypted block list to the security object;

transmitting the security object to the distributed file interface;

transmitting a close file request, along with the security object, from the distributed file system interface to the meta-data server, the close file request specifying the name of the first file; and removing the encrypted block list of the first file from the security object.

2. The method of claim 1, further comprising:

transmitting a file access request and security object from the distributed file system interface to the storage server in response to a file access request from a client application, the file access request including an operation code and a reference to selected data of a file;

decrypting the block list at the storage server in response to the file access request;

providing access to the selected data in accordance with the operation code upon successful decryption of the block list.

3. The method of claim 2, further comprising:

encrypting file data at the distributed file interface for file write operations using the encryption key in the security object; and decrypting file data at the distributed file interface for file read operations using the encryption key in the security object.

4. The method of claim 3, further comprising:

transmitting a close file request, along with the security object, from the distributed file system interface to the meta-data server, the close file request specifying the name of the first file;

removing the encrypted block list of the first file from the security object.

5. The method of claim 4, further comprising returning the security object from the meta-data server to the distributed file system interface after removing the block list.

6. The method of claim 5, further comprising deleting the security object if there are no block lists in the security object after processing a close file request.

7. The method of claim 1, further comprising:

encrypting file data at the distributed file interface for file write operations using the encryption key in the security object; and decrypting file data at the distributed file interface for file read operations using the encryption key in the security object.

8. The method of claim 1, further comprising returning the security object from the meta-data server to the distributed file system interface after removing the block list.

9. The method of claim 8, further comprising deleting the security object if there are no block lists in the security object after processing a close file request.

10. An apparatus for controlling access by a plurality of client applications to file data in a distributed file system including a distributed file system interface coupled to the client applications and a storage server and a meta-data server coupled to the distributed file system interface, comprising:

means for receiving at the meta-data server an open-file request, the open-file request specifying a name of a first file, wherein the first file includes a first set of blocks;

means for creating a security object at the meta-data server in response to the open-file request;

means for generating a partial encryption key at the meta-data server and storing the partial encryption key in the security object;

means for transmitting the security object to the storage server;

means for completing generation of the encryption key at the storage server using the partial encryption key and storing a complete encryption key in the security object;

means for returning the security object with the complete encryption key to the meta-data server;

means for encrypting a list that identifies the first set of blocks, whereby an encrypted block list is formed;

means for adding the encrypted block list to the security object;

means for transmitting the security object to the distributed file interface;

means for transmitting a close file request, alone with the security object, from the distributed file system interface to the meta-data server, the close file request specifying the name of the first file; and means for removing the encrypted block list of the first file from the security object.

11. A system for controlling access by a plurality of client applications to file data in a distributed file system, comprising:

a distributed file system interface coupled to the client applications, the interface configured to transmit open file requests to a meta-data server and file access requests to a block storage server;

the meta-data server coupled to the distributed file system interface and to the block storage server, the meta-data server configured to generate a partial encryption key, store the partial encryption key in a security object, transmit the security object to the block storage server for completion of the encryption key, encrypt a list of blocks in a file as an encrypted block list, and return the security object with the encrypted block list to the distributed file system interface;

the block storage server coupled to the distributed file system interface, the block storage server configured to generate a complete encryption key from the partial encryption key in the security object, and return the security object with the complete encryption key to the meta-data server;

wherein the distributed file system interface is further configured to transmit a close file request, along with the security object, from the distributed file system interface to the meta-data server, the close file request specifying the name of the first file, and the meta-data server is further configured to remove the encrypted block list of the first file from the security object.

12. The system of claim 11, wherein:

the distributed file system interface is further configured to transmit a file access request and the security object to the block storage server in response to a file access request from a client application, the file access request including an operation code and a reference to selected data of a file; and the storage server is further configured to decrypt the encrypted block list in response to the file access request and provide access to the selected data in accordance with the operation code upon successful decryption of the block list.

13. The system of claim 11, wherein:

the distributed file system interface is further configured to encrypt file data for file write operations using the encryption key in the security object decrypt file data for file read operations using the encryption key in the security object.

* * * * *

UNITED STATES PATENT AND TRADEMARK OFFICE
CERTIFICATE OF CORRECTION

| | |
|---|---|
| PATENT NO. | : 7,222,231 B2 |
| APPLICATION NO. | : 09/838759 |
| DATED | : May 22, 2007 |
| INVENTOR(S) | : Lance W. Russell et al. |

Page 1 of 1

It is certified that error appears in the above-identified patent and that said Letters Patent is hereby corrected as shown below:

In column 8, line 13, in Claim 10, delete "alone" and insert -- along --, therefor.

Signed and Sealed this

Twenty-first Day of October, 2008

JON W. DUDAS
*Director of the United States Patent and Trademark Office*